UNITED STATES PATENT OFFICE.

MART A. BEAL, OF CHICAGO, ILLINOIS, ASSIGNOR OF ONE-HALF TO JOSEPH A. GRIFFIN, OF SAME PLACE.

SEPARATING OIL FROM THE EARTH USED IN REFINING OILS OR FATS.

SPECIFICATION forming part of Letters Patent No. 298,816, dated May 20, 1884.

Application filed March 20, 1883. (No specimens.)

*To all whom it may concern:*

Be it known that I, MART A. BEAL, of the city of Chicago, county of Cook, and State of Illinois, have invented a certain new and useful Improvement in Separating Oil from the Earth Used in Refining Oils or Fats; and I do hereby declare that the following is a full, clear, and exact description of the invention.

In some of the processes of refining oils, greases, or fats, sometimes known as the process of "bleaching," certain kinds of earth are used as a bleaching agent, which at the end of the process are left impregnated with or combined with the oils or fat which they have operated upon, thus occasioning both a loss of oil and of the earth, which, thus impregnated, cannot be again used to advantage. Heretofore processes for this purpose, which have been principally the employment of powerful pressure, have been very imperfect, and have extracted only a portion of the oil or fat, and have failed to reclaim the earth, which has remained impregnated or combined with sufficient oil to prevent its further utilization. By my process not only is the oil almost wholly, if not entirely, extracted from the earth, thus saving a large percentage of loss in this respect, but the earth itself is reclaimed and restored to its original condition, so that it can be repeatedly utilized for the same purpose, thus preventing in another way an expensive waste.

My process consists, broadly, in boiling the impregnated earth in water under certain conditions. The earth impregnated with the oil or fat is taken from the vessel in which the bleaching process has been conducted and placed in an open vessel, and any desired amount of water (which should not be less than six parts of water to one of earth) added, the necessity of using this amount of water being to permit the free and active circulation of the particles of earth in the water, which could not take place if the quantity were unduly limited. While soft water is preferable in this process and produces more satisfactory results, it is not absolutely essential. Heat is then applied to the vessel and the water and earth brought to a state of violent boiling. During the interval between the application of the heat and the attainment of the boiling-point the earth and water should be stirred and kept thoroughly mixed, as, if the earth is permitted to remain in a mass at the bottom of the vessel, the agitation of the boiling water will not be sufficient to separate the particles of earth and start them in circulation. After the mixture begins to boil, the agitation produced by the boiling will be sufficient to keep the particles of earth in circulation, and the stirring may cease. By the circulation of the earth in the water in this manner every particle is subjected to the thorough action of the boiling water. The boiling should be continued until the oil or fat is thoroughly separated from the earth, which will be in about one hour in the case of oils and about three hours in the case of ordinary grease or fat; but the operator will easily learn by experience to determine when the process is complete. After the boiling is finished the earth should be allowed to thoroughly settle, care being taken that this portion of the process is allowed to be complete. The oil or fat will then remain on the top of the water and the earth will be deposited at the bottom. The oil or fat is then removed, the water drawn off, and the earth dried either in the vessel or after removal. The oil or fat will then be found to be almost entirely removed from the earth—at any event so nearly so as to permit the earth to be used again to advantage as a bleaching agent, although it is sometimes desirable to subject the earth to a repetition of the process of boiling, as described, to more thoroughly reduce it to its original condition. I have found that satisfactory results cannot be obtained by boiling in a hermetically-closed vessel, or by means of what is known as "open steam," where the boiling is produced by the direct introduction of steam into the liquid to be boiled.

Having thus described my invention, what I claim as new, and desire to secure by Letters Patent, is—

1. The method, substantially as described, of extracting oils or fatty substances from earth that has been used for refining fats or oils, which consists in subjecting the fat-saturated earth to boiling in a relatively large body of water, and then removing the fat from the surface of the water, substantially as set forth.

2. The process of separating the oil or fat from the earth which has been used as a bleaching agent by placing the earth in sufficient water to allow a free circulation of its particles, applying heat thereto, agitating the mixture until it is brought to a state of boiling, permitting it to boil until the separation is effected, and then allowing the earth to settle, substantially as described.

3. The process of separating the oil or fat from earth which has been used as a bleaching agent by placing the oil-impregnated earth in water in an open vessel, applying heat externally to the vessel, agitating the mixture until it is brought to a condition of boiling, permitting it to boil until the separation is effected, and then allowing the earth to settle, substantially as described.

MART A. BEAL.

Witnesses:
PLINY B. SMITH,
A. SILKE.